United States Patent [19]

Burlis

[11] 3,712,782
[45] Jan. 23, 1973

[54] EXTRUDER
[75] Inventor: Norbert W. Burlis, St. Louis, Mo.
[73] Assignee: Sherwood Medical Industries Inc.
[22] Filed: Feb. 25, 1971
[21] Appl. No.: 118,859

[52] U.S. Cl. ................... 425/380, 425/326, 425/145
[51] Int. Cl. ................................................. B29f 3/06
[58] Field of Search ..................... 425/130–133, 145, 425/166, 244, 245, 380, 376; 264/167, 177

[56] References Cited

UNITED STATES PATENTS

| 3,019,480 | 2/1962 | Soubier | 425/326 X |
| 3,039,141 | 6/1962 | Bauer | 425/132 |

Primary Examiner—R. Spencer Annear
Attorney—Hofgren, Wegner, Allen, Stellman & McCord

[57] ABSTRACT

An extruding apparatus for producing tube products, such as medical catheters, having very accurately controlled variations in inside diameter, outside diameter and wall thickness along their length, including a single extruder for producing plastic material and conveying the same selectively to either of two accumulator-injectors through a diverting valve. The accumulator-injectors are connected to deliver molten plastic selectively in their inject strokes to an extruding die through another diverting valve. The apparatus is constructed so that while the extruder is feeding molten plastic to one accumulator-injector, the other is connected to inject molten plastic into the die by appropriately positioning the die connected diverting valve. The very accurate control over the speed of each of the accumulator-injectors during their inject phases accompanied by accurate control of air flow to the die interior provide contour tubing having extremely close tolerances rendering such tubing capable of mass production quantities. Other embodiments of the present invention achieving the same objectives are described below.

8 Claims, 7 Drawing Figures

INVENTOR
Norbert W. Burlis
BY Hofgren, Wegner, Allen, Stellman, & McCord
ATTORNEYS

EXTRUDER

BACKGROUND OF THE PRESENT INVENTION

Various types of extruding apparatus have been provided in the past for producing tubing having variations in external diameter, internal diameter and wall thickness. Such extruding apparatus is designed to provide periodic and repetitive variations of the size of the tubing along the length of the extrudate so that the tubing may be thereafter cut at predetermined intervals into useable tubing products such as for the biomedical field, e.g. catheters. There are, however, a large variety of other tubing products that may be mass produced according to the apparatus of the present invention as will appear hereinbelow.

One prior apparatus for producing tubing having variations in diameter along its axial length includes a single extruder and die combination with a control for varying the speed of the extruder itself, thus, varying the flow from the extruder to the die in a programmed fashion.

Another extruder provided for producing tubing having variations in diameter along its axial length is that disclosed in the copending application of Norbert W. Burlis and Daniel A. Talonn, now U.S. Pat. No. 3,674,404, filed Aug. 6, 1970, assigned to the assignee of the present invention. In this prior application an extruding apparatus is disclosed including an extruder that feeds molten plastic to an extruding die through a conduit having an accumulator-injector therein. The accumulator is timed and programmed so that during the withdrawal phase thereof molten plastic is delivered from the extruder to the die at a reduced rate and during the inject phase of the accumulator-injector, molten plastic is delivered to the die at an increased rate providing a larger diameter or bubble section of extrudate.

The present invention produces tubing having variations in internal and external diameter and wall thickness, producing extrudate contours of high precision generally independent of fluctuations in the output of the extruder.

SUMMARY OF THE PRESENT INVENTION

According to the present invention an extruding apparatus is provided for mass producing tubing products having varying diameter sections while maintaining extremely close tolerances in inside diameter, outside diameter and wall thickness. This is accomplished broadly through the provision of a single extruder connected to feed an extruding die with two or more accumulator-injectors provided between the extruder and the extruding die.

According to one embodiment of the present invention an extruder selectively feeds molten plastic material through a diverting valve to one of two accumulator-injectors arranged in parallel. While the extruder feeds molten plastic to one of the accumulator-injectors, the other accumulator-injector injects molten plastic through another diverting valve to an extruding die.

After the inject cycle has been completed the valves are switched connecting the other accumulator-injector to receive molten plastic from the extruder, and connecting the first accumulator-injector to deliver molten plastic in its inject phase to the die. By accurately controlling the speed of the accumulator-injectors during the inject phase, the volume per increment of length of the resulting extrudate is very accurately controlled. Therefore, by also accurately controlling the volume of air delivered through the die to the interior of the extrudate the tolerances of each of the interior diameter, the exterior diameter and wall thickness of the tubing are accurately controlled. Since each accumulator is capable of producing a complete section of tubing including, for example, a nominal diameter portion and an enlarged diameter portion, variations in the output of the extruder do not effect the extruded tubing.

In a modified form of the primary embodiment the diverting valves are replaced with check valves that eliminate the necessity for synchronizing valve switching with the end of the accumulator-injector cycle.

According to still another embodiment of the present invention an extruder is provided connected to deliver molten plastic to an extruding die through a conduit having two or more serially arranged accumulator-injectors therein. The cycles of each of the accumulator-injectors remain fixed with the initiation of each of the actuators for the accumulator-injectors being programmed by a programming device to achieve a desired contour tubing. With each of the accumulator-injectors having a constant rate accumulate phase occurring simultaneously, a nominal size tubing results with two or more enlargements occurring at different intervals or one on top of the other, as desired. The actuators in this embodiment may also be phased so that while one or more accumulators are withdrawing molten plastic, one is injecting slowly to provide the nominal tubing diameter. Thereafter the actuator which was injecting slowly may switch to its withdrawal stroke while the other actuators continue in their withdrawal strokes, producing as a result a section of small diameter tubing.

The basic advantage in the serial arrangement of accumulators according to this embodiment as compared to the single accumulator-injector in U.S. Pat. No. 3,674,404, described above, is that each accumulator-injector may have a fixed cycle occurring at a predetermined withdrawal and inject rates without the necessity for programming the rate of withdrawal and inject to achieve varying contours in the tubing.

Moreover, it is more simple to produce tubing having a constant nominal diameter over most of its length employing the serial multiple accumulator-injector apparatus according to the present invention.

According to a fourth embodiment of the present invention, a single extruder feeds molten plastic to an extruding die through four parallel arranged feed branches each having one accumulator. This is basically the same functional arrangement as the third embodiment described above where the accumulators are serially arranged. No valves are provided between the accumulator-injectors and either the extruder or the die so that all may proceed in the withdrawal phase at the same time or in the inject phase at the same time, or with any desired phase relationship to provide a wide variety of tubing configurations.

DETAILED DESCRIPTION OF THE PREFERRED EMBODIMENTS

Figure 1:
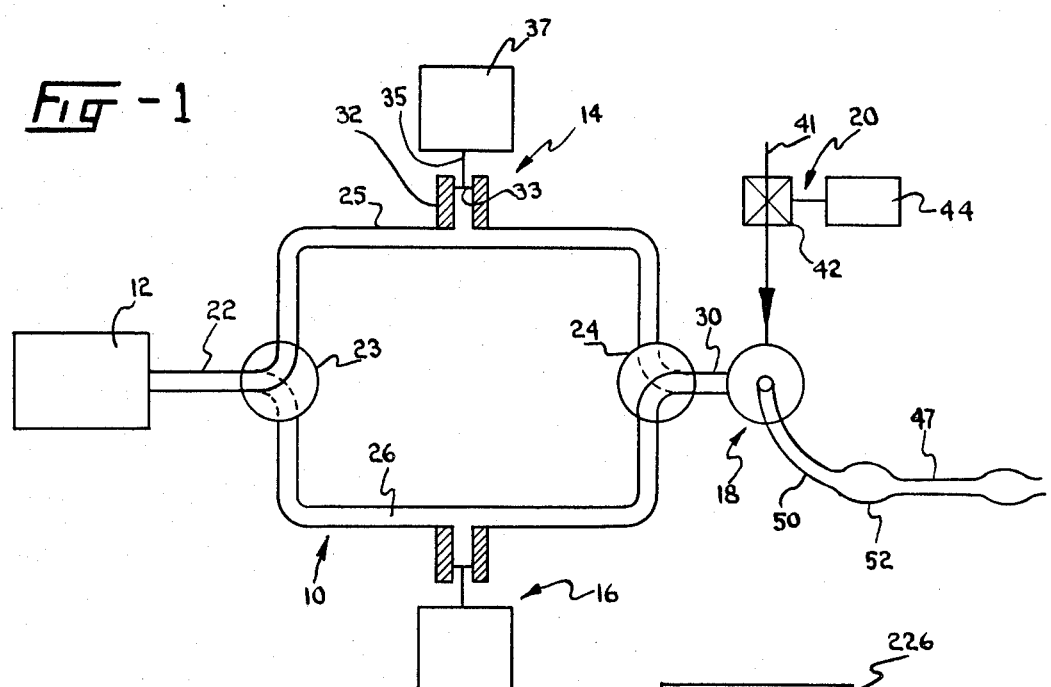
FIG. 1 is a schematic illustration of the primary embodiment of the present invention employing two accumulator-injectors in parallel with two diverting valves.

Referring to FIG. 1 an extruding apparatus 10 is illustrated consisting generally of an extruder 12, a first accumulator-injector 14, a second accumulator-injector 16, and an extruding die 18 that receives air through an air supply system 20.

An outlet conduit 22 from the extruder 12 is selectively connected by three way rotary diverting valve 23 to either conduit 25 or 26.

Similarly, conduits 25 and 26 are selectively connected to die inlet port 30 by a second three way rotary diverting valve 24.

The accumulator-injectors 14, 16 are identical so that a description of one is believed sufficient. The accumulator-injector 14 is seen to consist of a cylinder 32 communicating with conduit 25 and having slidable therein a piston 33 reciprocated by rod 35 driven by an actuator 37.

The actuator 37 drives piston 33 in a withdrawal phase drawing molten plastic from conduit 25 into cylinder 32 and an inject phase injecting molten plastic previously drawn into cylinder 32 into the conduit 25.

The air control system 20 includes an air supply line 41, air control valve 42 in the line and a valve control 44. The extrudate is illustrated diagrammatically at 47.

In operation, valve 23 is switched to deliver molten plastic from conduit 22 to conduit 26 at the same time that accumulator-injector 16 begins its withdrawal phase. At the same time valve 24 is shifted to connect conduit 25 to inject molten plastic into conduit 30 as the accumulator-injector 14 begins its inject phase. The rate of injection of accumulator-injector 14 may initially be slow producing a small diameter tube section such as shown at 50. The air control 44 carefully controls the air flow to the die 18 which in combination with the carefully controlled molten plastic flow from the accumulator-injectors 14 and 16 provide close tolerances on the interior diameter, exterior diameter and wall thickness of tubing 47.

At a predetermined time during the inject phase of accumulator-injector 14, the rate of injection is increased producing an increased volume per increment length of extrudate through die 18, which, in combination with increased pressure from air supply line 41, as controlled by control 44, provides a larger diameter section 52 in tubing 47.

The valves 23 and 24 are then shifted so that molten plastic is delivered to the accumulator-injector 14 while accumulator-injector 16 is connected to inject molten plastic into die 18. Thus, each accumulator-injector produces a complete section of tubing, including sections 50 and 52, through appropriate control of the rate of injection thereof, independent of the operation of the extruder 12.

It should be noted that the total cycle time of each of the accumulator-injectors 14 and 16 must be equal, but the inject phases of each may proceed at different rates to alternately produce different tubing contours. Moreover, the size of the cylinders 32 associated with each of the accumulator-injectors 14, 16 may be varied to vary displacement volume.

Figure 2:
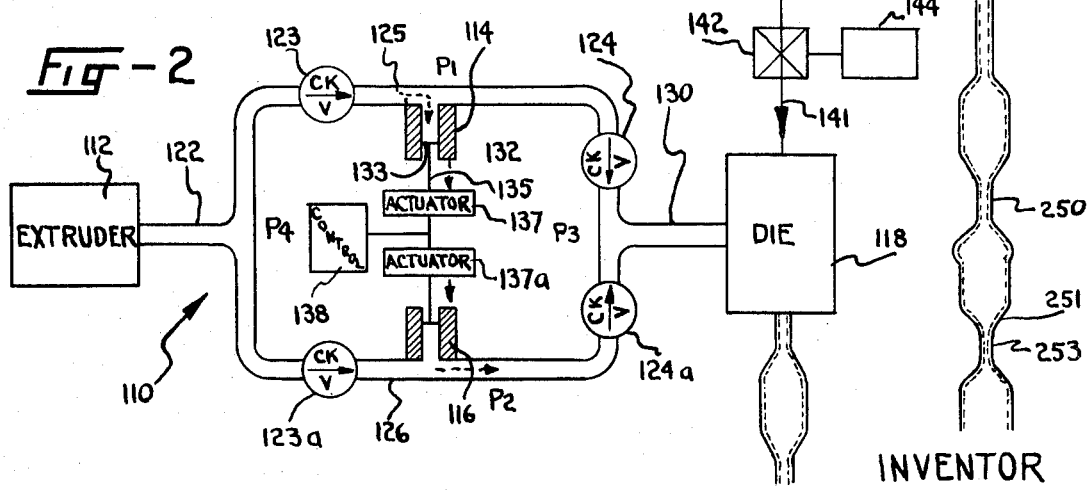
FIG. 2 is an extruding apparatus according to a second embodiment of the present invention employing a single extruder, two parallel arranged accumulator-injectors with check valves controlling the flow from the extruder to the accumulator-injectors and from the accumulator-injectors to the extruding die.

An extruding apparatus 110 is illustrated in FIG. 2 which is functionally similar to the one illustrated in FIG. 1 with the exception of the valving arrangement. An extruder 112 is provided that conveys molten plastic selectively to parallel arranged accumulator-injectors 114 and 116 which selectively inject molten plastic through an extruding die 118 producing an extrudate having variations in contours depending upon the injection rates of the two accumulator-injectors 114, 116 and the air flow to the die through supply line 141.

The accumulator-injector 114 communicates with a conduit 125 connected at one end to extruder outlet 122 and at the other end to die inlet 130. Accumulator-injector 116 communicates with a conduit 126 in parallel with conduit 125 and connected at one end to extruder outlet 122 and at the other end to die inlet 130. Check valves 123 and 123a are provided between the accumulator-injectors 114, 116 and extruder 112 in lines 125 and 126, respectively, while check valves 124 and 124a are provided between the accumulator-injectors 114 and 116, and the die inlet 130 in lines 125 and 126, respectively. Check valves 123 and 123a permit flow from the extruder to the accumulators but prevent flow in the reverse direction, while check valves 124 and 124a permit flow from the accumulator-injectors 114, 116 to the die inlet 130 but prevent flow from the die inlet to either of the accumulator-injectors.

Air in line 141 is controlled by valve 142 actuated by control 144 to accurately control the interior diameter, exterior diameter and wall thickness of the tubing in the same manner as in the FIG. 1 embodiment.

Accumulator-injector 114 includes a cylinder 132, piston 133 and a piston rod 135 driven by an actuator 137. A second actuator 137a operates accumulator-injector 116 and a common control 138 operates both actuators 137 and 137a.

In operation, and assuming the actuator 137 is driving the accumulator-injector 114 in its withdrawal phase and the actuator 137a is driving the accumulator-injector 116 in its inject phase, pressure in line 125 will decrease and pressure in line 126 will increase. The higher pressure in extruder outlet 122 will open check valve 123 and permit flow from the extruder into accumulator-injector 114. At the same time the pressure rise in line 126 as a result of the injection from accumulator-injector 116 is sufficient to close valve 123a against pressure in the extruder outlet, and open check valve 124a permitting flow to the die inlet 130. Also, pressure in line 126 and die inlet 130 is above the pressure in line 125 because of the withdrawal phase of accumulator-injector 114 so that check valve 124 remains closed at this time.

Upon completion of the inject phase of the accumulator-injector 116 actuators 137 and 137a reverse and drive the accumulator-injector 116 in its withdrawal phase and accumulator-injector 114 in its inject phase. In this mode, check valve 123a will open permitting flow from extruder 112 to the accumulator-injector 116, and check valve 123 will close. Moreover, check valve 124 will open permitting flow from accumulator-injector 114 to die 130 with check valve 124a being forced closed due to the pressure differential thereacross. Thus, it is seen that the valving in the embodiment of FIG. 2 is automatically controlled due to the pressure differentials resulting from the withdrawal and inject phases of the commonly driven accumulator-injectors 114 and 116.

Figure 3:
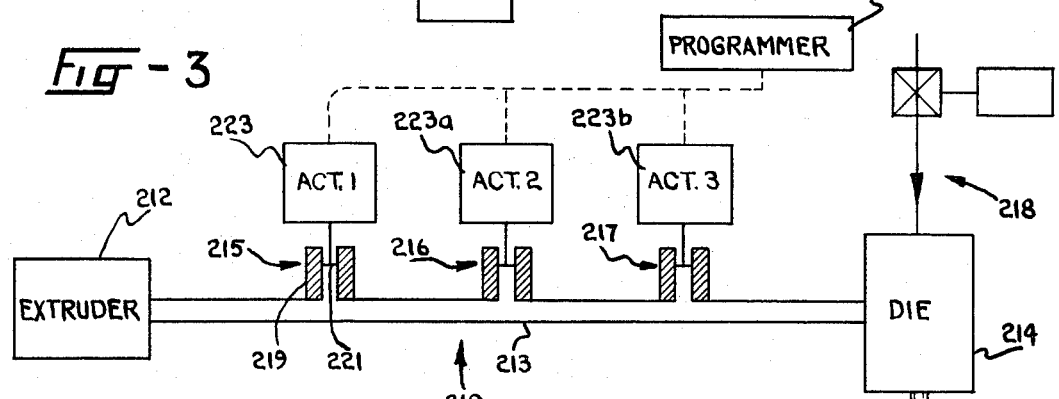
FIG. 3 is a schematic illustration of another embodiment of the present invention including an extruder with three serially arranged accumulator-injectors.

In FIG. 3 a modified form of an extruding apparatus 210 is illustrated including an extruder 212 which delivers molten plastic through conduit 213 to an extruding die 214 having an air control 218 similar to that described with respect to the FIGS. 1 and 2 embodiments.

Communicating with conduit 213 are serially arranged accumulator-injectors 215, 216 and 217. Each of the accumulator-injectors 215, 216 and 217 includes a cylinder 219 communicating with conduit 213, and a piston 221 slidable in cylinder 219 and driven by an actuator 223.

The actuators 223, 223a and 223b are controlled by programmer 226 which controls the initiation and rates of injection of each of the cycles of operation of the accumulator-injectors 215, 216 and 217.

Figure 4:
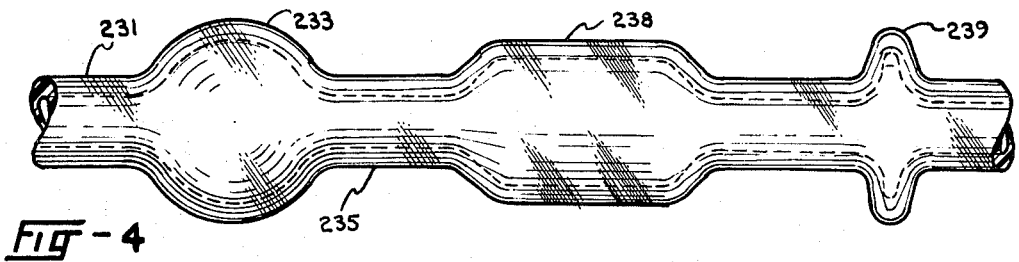
FIGS. 4 and 5 are elevation views of tubing sections formed by the extruding apparatus shown in FIG. 3.

The tubing 230 illustrated in FIG. 4 is produced by the apparatus 210 of FIG. 3. Programmer 226 is programmed so that it places each of the accumulator-injectors in a constant withdrawal phase at the same time producing a nominal diameter portion 231 of the tubing.

In response to an appropriately timed signal from programmer 226, actuator 223 reverses accumulator-injector 215 placing it in its inject phase producing an increase in flow through the die and the resulting bubble portion 223. At the end of the inject phase of accumulator-injector 215 its withdrawal phase is automatically initiated, again producing a section 235 having the same nominal diameter as section 231. Actuators 223a and 223b are sequentially actuated in the same manner by programmer 226 to produce bubble portions such as illustrated at 238 and 239 in FIG. 4.

Figure 5:
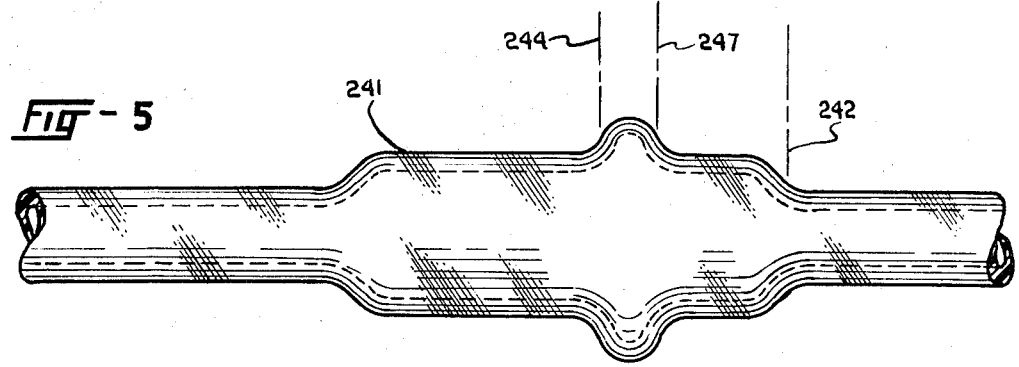

If the programmer 226 overlaps the inject phases of two of the accumulator-injectors 215, 216 and 217, a double bubble will be produced in the tubing as shown in FIG. 5 with bubble portion 241 being produced by the inject phase of one accumulator extending to line 242, and bubble portion 244 being provided by the overlapping inject phase of a second accumulator terminating at line 247.

Still another tubing configuration technique is illustrated in FIG. 3 where the nominal diameter portion 250 of the tubing is produced by placing two of the actuators in the withdrawal stroke and one of the actuators in a slow inject stroke. At a certain point indicated at line 251 in FIG. 3 the actuator that was slowly injecting is reversed into its withdrawal phase providing a short reduced diameter section 253.

The extruder 210 is extremely desirable for producing very long products of essentially one diameter over their length but with two or more bubbles of different lengths and at different intervals.

Figure 6:
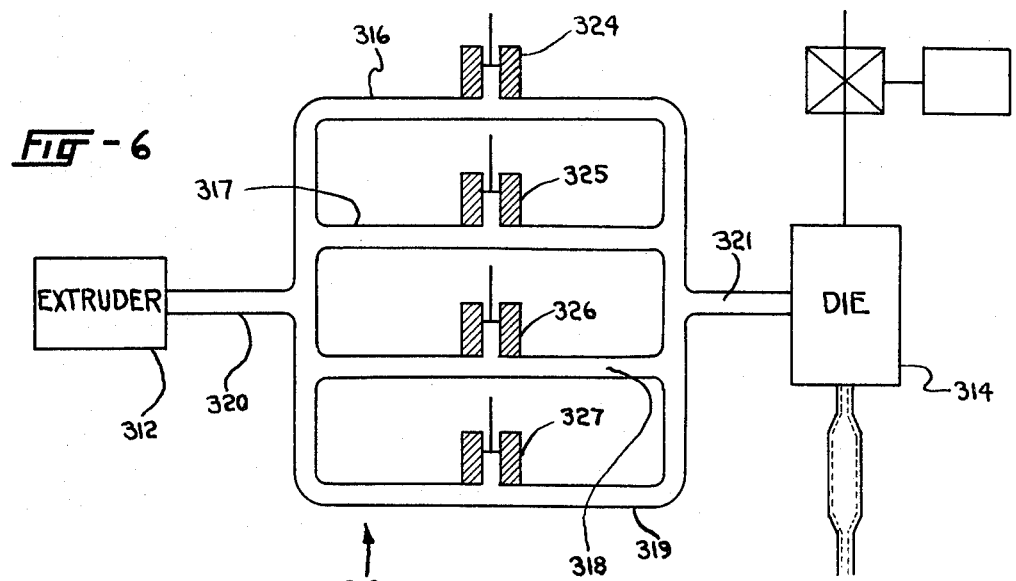
FIG. 6 is a schematic illustration of an extruding apparatus according to a fourth embodiment of the present invention employing four parallel arranged accumulator-injectors.

In FIG. 6 an extruding apparatus 310 is illustrated generally similar in functional operation to that shown in FIG. 3. Extruder 310 is seen to consist of an extruder 312 that supplies molten plastic to a die 314 through parallel arranged conduits 316, 317, 318 and 319 interconnecting extruder outlet 320 and die inlet 321. Accumulator-injectors, similar to those in the other embodiments, 324, 325, 326 and 327 are provided in the conduits 316, 317, 318 and 319, respectively.

The extruding apparatus 310 differs from that shown in FIGS. 1 and 2 basically in that no valving is provided between the various accumulator-injectors so that their withdrawal and inject phases may overlap or be out of phase in a manner to provide tubing having a wide variety of contours.

Figure 7:
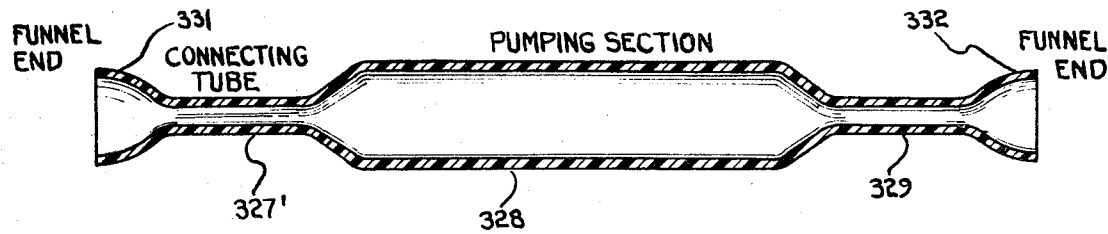
FIG. 7 is a roller pump tubing section formed by the apparatus shown in FIG. 6.

The extruding apparatus 310 could be used to make tubing for a roller pump such as illustrated in FIG. 7 including a small bore connecting section 327', a pumping section 328, another small diameter section 329 and funnel ends portions 331 and 332, respectively.

Other variations in the present invention, such as a combination of the series and parallel arrangements of FIGS. 3 and 6 could be provided, although not shown in the drawings. As with the FIG. 1 embodiment, the extruding apparatus of FIGS. 2, 3, and 6 may have differing sized accumulator-injectors depending upon the requirements of the product to be produced.

I claim:

1. An apparatus for extruding tubing having axially spaced sections of different diameters, comprising: extruding die means for continuously producing a tubular extrudate, means for continuously producing molten plastic material, conduit means interconnecting said means for producing molten plastic material and said extruding die for establishing a flow path for continuous delivery of said material from said means for producing molten plastic material to said die, first accumulator-injector means for withdrawing a portion of said material from said conduit means and thereafter injecting it therein, second accumulator-injector means for withdrawing a portion of said material from said conduit means and thereafter injecting it therein, and means for controlling the withdrawal and inject phases of said first and second means for producing said tubing with axially spaced sections of different diameters.

2. An apparatus for extruding tubing as defined in claim 1, wherein said conduit means includes a first conduit interconnecting said molten plastic producer and said extruding die, said first accumulator-injector communicating with said conduit, and a second conduit interconnecting said molten plastic producer and said extruding die, said second accumulator-injector communicating with said second conduit, said second conduit being in parallel with said first conduit.

3. An apparatus as defined in claim 2, including valve means in said first and second conduits between said accumulator-injectors and said extruding die and said accumulator-injectors and said molten plastic producing means.

4. An apparatus as defined in claim 1, wherein said first and second accumulator-injectors are in series between said molten plastic producer and said extruding die.

5. An apparatus as defined in claim 2, including a third conduit interconnecting said molten plastic producer and said extruding die in parallel with first and second conduits, a third accumulator-injector communicating with said third conduit for withdrawing molten plastic therefrom and injecting it thereto.

6. An extruding apparatus, comprising: an extruding die, an extruder, first conduit means interconnecting said extruder to said extruding die, a first accumulator-injector communicating with said first conduit means for withdrawing and injecting molten plastic relative thereto, second conduit means in parallel with said first conduit means interconnecting said extruder and said extruding die, a second accumulator-injector communicating with said second conduit means for withdrawing and injecting molten plastic relative thereto, means for controlling said first and second accumulator-injectors so that when one is in its withdrawal phase the other is in its inject phase, first valve means selectively connecting said first or second conduit means to the extruder, and second valve means selectively connecting said first or second conduit means to the extruding die.

7. An extruding apparatus as defined in claim 6, wherein said first valve means is a three way rotary valve, said second valve means being a three way rotary valve.

8. An extruding apparatus as defined in claim 6, wherein said first and second valve means include a check valve in each of said first and second conduit means upstream of said first and second accumulator-injectors, and a check valve in each of said first and second conduit means downstream from the first and second accumulator-injectors.

* * * * *